United States Patent [19]

Ostrovsky et al.

[11] Patent Number: 5,123,045
[45] Date of Patent: Jun. 16, 1992

[54] COMPREHENSIVE SOFTWARE PROTECTION SYSTEM

[75] Inventors: Rafail Ostrovsky, Acton, Mass.; Oded Goldreich, Tel Aviv, Israel

[73] Assignee: Massachusetts Institute of Technology, Cambridge, Mass.

[21] Appl. No.: 476,814

[22] Filed: Feb. 7, 1990

Related U.S. Application Data

[63] Continuation-in-part of Ser. No. 395,882, Aug. 18, 1989, abandoned.

[51] Int. Cl.$^5$ .............................................. H04L 9/00
[52] U.S. Cl. .................................... 380/4; 380/46; 364/969
[58] Field of Search ................... 380/3, 4, 46; 364/246.6, 255.1, 255.8, 949.81, 961, 961.2, 969

[56] References Cited

U.S. PATENT DOCUMENTS

| | | | |
|---|---|---|---|
| 3,555,513 | 1/1971 | Hauck et al. | 364/255.1 |
| 3,568,155 | 3/1971 | Abraham et al. | 364/961 |
| 4,168,396 | 9/1979 | Best . | |
| 4,306,289 | 12/1981 | Lumley | 380/4 |
| 4,465,901 | 8/1984 | Best | 380/4 |
| 4,506,364 | 3/1985 | Aichelmann, Jr. et al. | 380/4 |

OTHER PUBLICATIONS

O. Goldreich, "Towards a Theory of Software Protection and Simulation by Oblivious RAMs," *Proc. ACM Symposium on Theory of Computing*, 1987.

M. Blum and S. Goldwasser, "An Efficient Probabilistic Public-Key Encryption Scheme Which Hides All Partial Information," *Proc. of CRYPTO-84*, 1984, 289-299.

S. Goldwasser and S. Micali, "Probabilistic Encryption," *Journal of Computer and System Sciences*, 28(2), Apr. 1984.

K. E. Batcher, "Sorting Networks and Their Applications," *Proc. of AFIPS Spring Conf.*, vol. 32, 1968.

C. P. Schnorr, "The Network Complexity and the Turning Machine Complexity of Finite Functions," *Acta Informatica*, 7 (1976), 95-107.

M. Ajtai, J. Komlos and E. Szemeredi, "An O(n log n) Sorting Network," *Proc. ACM Symposium on Theory of Computing*, 1983.

N. Pippenger and M. J. Fischer, "Relations Among Complexity Measures," *Journal of the Assoc. for Computing Machinery*, 26(2) Apr. 1979, 361-381.

O. Goldreich, S. Goldwasser and S. Micali, "On the Cryptographic Applications of Random Functions," *Proc. of CRYPTO-84*, 1984, 277-289.

M. Luby and C. Rackoff, "How to Construct Pseudorandom Permutations from Pseudorandom Functions," *SIAM J. Comp.*, 17(2), Apr. 1988, 373-386.

O. Goldreich, S. Goldwasser and S. Micali, "How to Construct Random Functions," *Journal of the Association for Computing Machinery*, 33(4), Oct. 1986, 792-807.

A. V. Aho, J. E. Hopcroft and J. D. Ullman, *The Design and Analysis of Computer Algorithms*, 1974, 5-7.

R. Ostrovsky, "Efficient Computation on Oblivious RAMs", *Proc. ACM Symposium on Theory of Computing* 1990, pp. 514-523.

*Primary Examiner*—Tod Swann
*Attorney, Agent, or Firm*—Hamilton, Brook, Smith & Reynolds

[57] ABSTRACT

An efficient software protection scheme is presented in which a data processing system provides comprehensive software protection using hardware and software measures. Specifically, it provides protection of the pattern of access to memory during execution of a program and also provides protection of the data stored in memory. The protection scheme is secure in the sense that it behaves like a black box which reveals no information other than the I/O behavior and running time. Thus, not only the values stored in the general purpose memory are hidden, but also the sequence in which memory location are accessed during execution is hidden. This comprehensive scope of protection is achieved by an extremely efficient scheme. In particular, if the running time of the original program it T, the running time of the protected program is only slower by some factor of $(\log T)^C$ where C is a small constant.

44 Claims, 3 Drawing Sheets

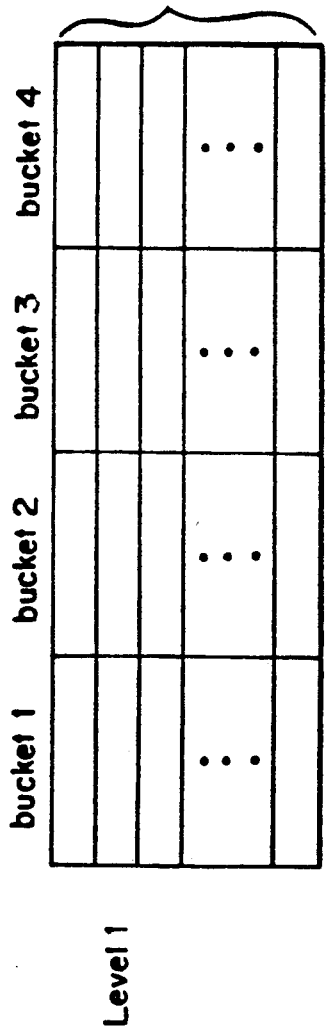
Fig. 3
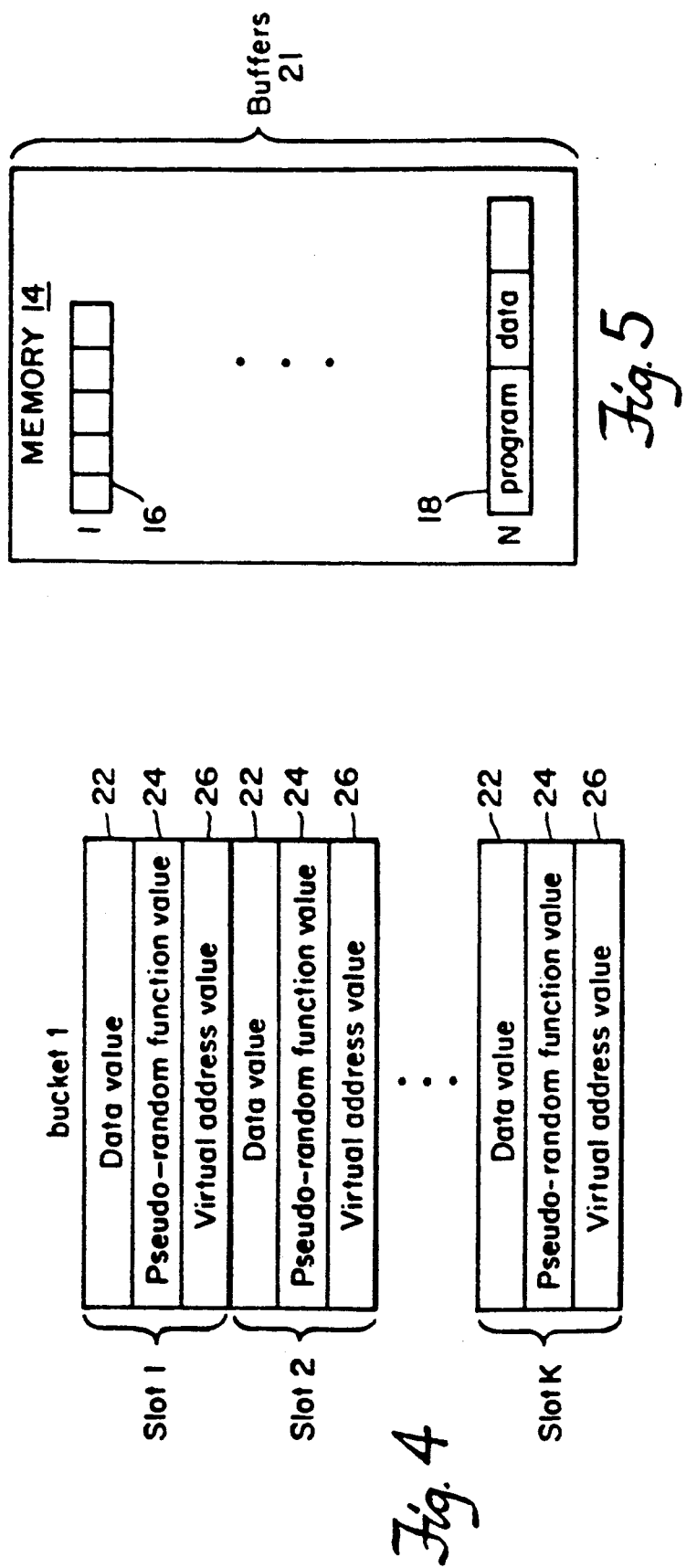
Fig. 5
Fig. 4

COMPREHENSIVE SOFTWARE PROTECTION SYSTEM

RELATED PATENT APPLICATIONS

The present application is a continuation in part of pending U.S. Patent Application entitled "Comprehensive Software Protection System", Ser. No. 07/395,882 by Ostrovsky et al., filed Aug. 18, 1989 now abandoned.

BACKGROUND OF THE INVENTION

In recent years piracy of software has become a major concern of software related companies. Pirates have used borrowed and rented software to extract illicit copies of such software. How one prevents a pirate from illegally copying software is a question of "software protection". Ideally software protection should be comprehensive enough that when a potential pirate executes the program he can gain no information which will help him understand the operation of the program from the execution other than the input and output. In essence, comprehensive software protection should cause the software to act as a "black box" where only the input and output are available to all users.

Levels of software protection less than the "black box" level of protection give away information that may be useful to the pirate. For instance, even leaving a pattern of memory accesses unprotected when a program is executing gives away information about the program. Given the expense and complexity of many current software packages, there is a strong motive to prevent loss of such information to the potential pirate.

One approach proposed to protect software was presented in O. Goldreich, "Towards a Theory of Software Protection and Simulation by Oblivious RAM's", *Proc. of ACM Symposium on Theory of Computing*, 1987.

SUMMARY OF THE INVENTION

To implement the present invention, a data processing system is used that provides protection of software from adversarial observers for a generic random-access machine (RAM) model of computation. The data processing system is comprised of a physically protected CPU. This CPU is inaccessible by adversarial observers. The data processing system further includes a plurality of "buffer" data structures for storing encrypted software and data in an unprotected memory. The software and data are stored in accordance with a pseudo-random mapping such that the pattern of access during execution of the program reveals no information to adversarial observers.

The present invention is an efficient software protection scheme under some minimal assumptions. In particular, the scheme is secure assuming the existence of a physically shielded chip containing a constant number of registers and the existence of any one-way function. The shielded chip can be connected to any general-purpose unprotected computer. The present invention specifies a cryptographic compiler which transforms source-code programs into equivalent compiled programs which run on a general-purpose computer using the protected chip. No polynomial-time malicious pirate can learn any additional information about the compiled programs except their I/O behavior (even if the pirate experiments with the compiled programs and changes the contents of the memory as he pleases). This conclusion assumes that it is infeasible to open the physically protected chip without destroying the contents of its registers and that it is infeasible to invert a one-way function.

Programs executed using the present invention run only poly-logarithmically slower than the original source-code programs. It should be stressed that the physically protected chip has only a constant number of registers and that the compiled programs reside in the unprotected, general-purpose random access memory. The present invention achieves amortized poly-logarithmic overhead as a function of the program running time instead of poly-logarithmic overhead of total RAM memory size, which in many instances is larger than the program running time.

In accordance with the present invention, a method is provided for efficiently protecting an access pattern of an executing program to a plurality of unprotected addressable locations. These unprotected addressable locations may comprise random access memory location entries in a distributed data base, in a compound data structure or in any other locations that may be addressed. The method is implemented in a data processing system having at least one physically protected resource. The method of protection comprises initially permuting the order in which values are stored in the unprotected addressable locations prior to the beginning of execution of the program. Subsequently, the order in which values are stored in subsets of the unprotected adjustable locations is partially permuted at various times during the execution of the program. Lastly, the values at the unprotected adjustable locations are accessed in light of the order imposed by the permuting step and by the partially permuting step. Specific accesses are achieved within an access pattern which is independent of the original access pattern.

The number of physically unprotected (but encrypted) adjustable locations may be dynamically altered during execution of the program. Moreover, the permuting step and the partial permuting step are preferably performed using a pseudo-random function having a seed stored within the physically protected resource. The partial permuting step includes the step of transferring values from one subset of the unprotected adjustable locations to another subset of the unprotected adjustable locations. The frequency with which the partial permuting step occurs during execution of the program depends on how many values are in a subset of unprotected addressable locations. Given that each subset may be of a different size, the frequency with which the various subsets are permuted differs. It is preferred that each subset of unprotected addressable locations be unique and not share addressable locations with other subsets. It is preferred that there are in the order of log a (i.e. O(log a)) subsets of unprotected addressable locations, where a is the security parameter, so that $2^a$ steps of computation is unachievable.

Each subset may have a unique level associated with it such that the level is designated by an integer j in the range from one to N. Each subset may have $CK^j$ log a unprotected addressable locations, where K and C are constants. Given this configuration, an additional step is provided where the values stored in the subset level i are moved to a subset of level i+1 every $K^{i-1}$ steps. For each, the subset of level i+1 is permuted.

In accordance with a more specific embodiment of the present invention, a program and the data that the program uses are stored in a highest level buffer of a set of buffers held in memory. The program and the memory are comprised of a plurality of virtual memory locations such that for each virtual memory location there is an associated virtual memory address. The virtual memory locations that make up the program and the data are stored in physical addresses specified by a psuedo-random function of the virtual addresses.

Unprotected memory is divided into buffers of different sizes. Each buffer is accessed whenever a memory access is sought. When the virtual memory location that is sought is located by a program, its contents are moved from the current physical location to a lowest level (i.e. smallest) buffer in the set of buffers. In order to conceal which buffer the contents of the virtual memory location are found the access pattern allows movement from every buffer to the top level buffer. As fixed intervals (i.e. when a buffer may be potentially full) the buffer's contents are moved to a next higher priority buffer and are pseudo-randomly rearranged so that the order in which the virtual memory locations are held in the next higher priority buffer is shuffled. The movement from the lower order buffer to a higher order buffer is achieved preferably using a pseudo-random function of virtual addresses of the contents to be moved. These buffers may be viewed as sets of hash-tables because the pseudo-random function acts as a hash function.

The present invention includes a method of preventing an adversary from replacing contents of a physical memory location with contents from another physical memory location. In order to achieve this protection, a seed is stored for a pseudo-random function in memory. In each memory location, a data value, a virtual address and a value of pseudo-random function of the data value are stored. The seed of the psuedo-random function value is the seed stored in the physically protected memory space. After each memory access, the CPU checks to see whether a proper psuedo-random function value is stored in the accessed memory location. If an improper psuedo-random function value is stored in an accessed location, execution of the program terminates.

Moreover, the present invention prevents an adversary from replacing contents of a physical memory location with previously held contents of the same physical memory location. The seed for a psuedo-random function is stored in memory space that is accessible by the physically protected CPU. The CPU and its on-chip memory are inaccessible to the adversary. Each time the accessible memory is shuffled (permuted), a counter is incremented, and the current counter value is encrypted and stored in each memory location. For each memory access to a memory, the system checks to see whether a proper counter value is stored in the accessed memory location. If an improper counter value is stored in an accessed memory location, execution of the program terminates.

BRIEF DESCRIPTION OF THE DRAWINGS

FIG. 3 shows a detailed view of a buffer in block form.

FIG. 4 shows a detailed view of a bucket in block form.

FIG. 5 shows the initial state of the memory.

DETAILED DESCRIPTION OF THE PREFERRED EMBODIMENT

The preferred embodiment of the present invention provides comprehensive software protection. It is comprehensive in that execution of the program reveals no information to any adversary other than the input and the output. The program, thus, acts like a black box. The types of protection embodied with the preferred embodiment include protection of the access pattern to memory by the program and protection of values held in memory such as data and instructions.

The comprehensive protection of the preferred embodiment is achieved through a combination of software and hardware. A combination of software and hardware is used because software protection alone cannot adequately protect a program from piracy given that software can always be copied. As such, certain hardware measures must be employed. The preferred embodiment of the present invention employs both hardware measures and software measures but in an extremely efficient manner so as to minimize the overhead incurred for protection, including hardware requirements. It is assumed that a standard random access machine model of computation is followed, such as disclosed in Aho, A. V., Hopcroft, J. E. and Ullman, J. D., *The Design and Analysis of Computer Algorithms*, 1974.

Figure 1:
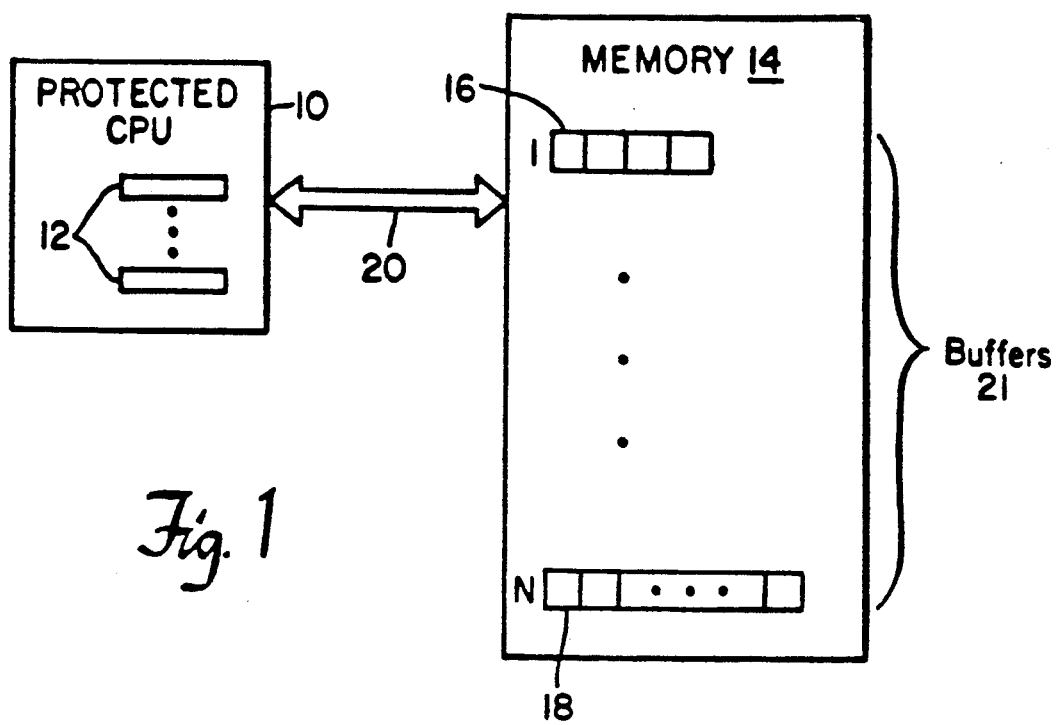
FIG. 1 shows the major components of the data processing system in block form.

FIG. 1 shows the major components of the data processing system used for protecting software in the preferred embodiment. Software executed by such a data processing system is protected from assault by adversaries. The hardware measures employed include a physically protected CPU 10. The CPU 10 may be protected in a number of different manners including those approaches disclosed by Best, U.S. Pat. No. 4,168,396, issued September 1979 and by Kent, S. T., "Protecting Externally Supplied Software in Small Computers", Doctoral Thesis, Massachusetts Institute of Technology, 1980. Because the CPU 10 is physically protected, any memory inside it as well as the activities it performs cannot be observed by a potential adversary. The constant size memory space 12 within the CPU is preferably limited to a plurality of registers. The use and significance of these registers will become more apparent in the discussion below.

The protected CPU 10 is in communication with a random access memory 14. All such communications travel over a bus 20. The bus 20 and the memory 14 are unprotected and, thus, are susceptible to adversarial observation and alteration.

Moreover, in the absence of protective measures, an adversary can manipulate activity within the memory 14. Conceptually, data structures located in the memory 14 are organized into a plurality of buffers 21. In the preferred embodiment, these buffers are data structures rather than physical structures, although they alternatively may be physical structures in some embodiments. These buffers 21 are organized into levels. Each buffer has a level denoted by an integer value between 1 and N, where N is a predefined integer value (i.e., buffers have levels such as 1, 2, ..., N). Additional buffers may be dynamically allocated, if the program requires more time to run. Programs that are executed and the data upon which they act are stored in the buffers 21 held in memory 14. In particular, they are typically stored in several different buffers, as will be discussed below.

The basic approach used to provide software protection in the preferred embodiment is to first encrypt the software and any data that it uses. The software and the data are then stored in encrypted form in a buffer held in memory 14. Because the software and data are encrypted, an adversary cannot determine the true values of the data or the type of instructions held in memory 14. Encryption alone, however, does not protect the access pattern to memory 14 when the program is executed. To provide such protection, other strategies are employed.

Before delving into the strategies for access pattern protection, it is necessary to first understand what transpires when a program is executed by the data processing system. For each instruction, the physically protected CPU 10 of the data processing system performs several steps. First, it fetches the instruction from memory 14. Since the instruction is in encrypted form, the CPU 10 decrypts the instruction before attempting to execute it. This decryption occurs only within the physically protected CPU 10 and thus, is not visible to any adversaries. Once the instruction is decrypted, the CPU 10 executes the instruction. The results of execution are stored, in some instances, at a memory location. The instruction may also require accessing and altering of other memory locations.

The pattern of memory accesses may reveal useful information to an adversary and therefore, must be hidden. The major steps employed in the preferred embodiment are as follows. Initially, both the code of the program and the data are stored in a large Nth level buffer of the array of N buffers. Next, execution of the program is begun. Each time a memory access is desired, the CPU 10 examines each of the buffers for the memory location that is sought. Only one of the buffers will have the memory location truly sought. The other memory accesses are dummy accesses designed to fool adversaries. When a desired memory location is found, it is moved up to the level 1 buffer. Periodically, at fixed intervals of time, the contents of the buffers are shifted to adjacent buffers and shuffled like a deck of cards.

The pattern of access appears arbitary to an observer. He cannot discern which one of the accesses to the numerous buffers is the actual access. Furthermore, the physical memory address of a memory location periodically changes through a secure routine so that multiple accesses to the same location will require access to different physical addresses. Such changes in physical memory address are particularly difficult for an adversary to follow because all the data is encrypted, and because the transfers involve movement of multiple values. In sum, the probability distribution of the memory accesses witnessed by adversaries is independent of the memory accesses sought by the program.

Figure 2:
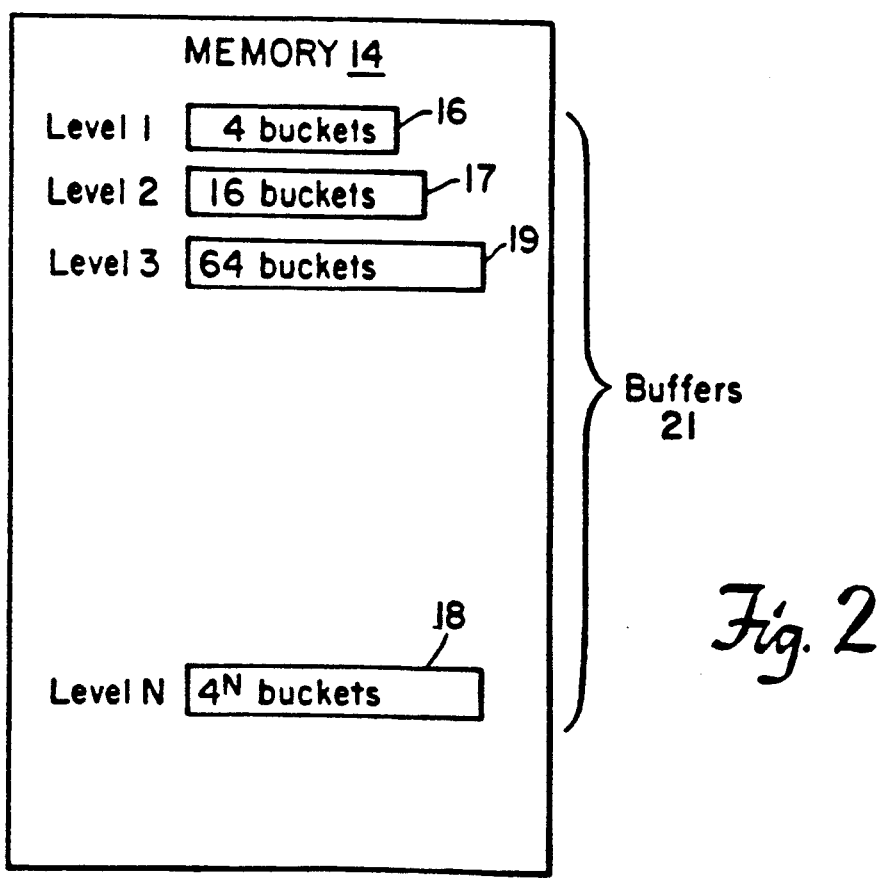
FIG. 2 shows a detailed view of the memory in block form.

The specifics of the implementation can be seen more clearly in FIG. 2 which shows a more detailed view of the memory 14. FIG. 2 illustrates that the size of the buffer increases as the level of the buffer increases. For instance, as depicted in FIG. 2 merely for illustrative purposes, the level one buffer 16 has four buckets wherein each bucket constitutes a set of memory locations. The level two buffer 17, in contrast, has sixteen buckets, and the level three buffer 19 has sixty-four buckets. Lastly, the level N buffer has $4^N$ buckets. In general, the number of buckets in a buffer is $X^L$, where X is the number of buckets in the level one buffer, and L is the level of the buffer. The choice of these sizes of buffers provides for an efficient implementation of the present invention. The number of buckets shown in arbitrary, and it should be noted that the buffers may be comprised of different quantities of buckets.

As was mentioned previously, each bucket constitutes a set of memory locations. These memory locations are referred to as slots. In the preferred embodiment, each bucket has length K slots, where K is the security parameter such that $2^K$ is an infeasible length for computation by any polynomial time adversary.

The memory necessary for execution of a program can be best viewed as simply a plurality of virtual memory locations. As was mentioned previously, these virtual memory locations store the code and the data of the program. Each virtual memory location has a unique virtual memory address associated with it. It is important to bear in mind the distinction between a virtual memory address and a physical memory address. A virtual address is the address referenced by the program and is distinct from a physical address which identifies the physical location where the virtual memory location resides. The two address values may coincide in some instances, but generally, they are different. It is this difference that is exploited to protect the virtual address access pattern of an executing program.

Initially, the code and the data are stored in the highest level buffer 18. The code and data constitute a plurality of virtual memory locations. They are not stored in the order in which their corresponding virtual addresses are sequenced; rather, they are stored in a pseudo-random sequence. To determine where a virtual memory location is stored in the highest order buffer 18, a pseudo-random function F is used. A distinct seed $S_i$ is associated with each buffer, where i goes from 1 to N. The value of the seed changes throughout the execution of a program. This pseudo-random function F is preferably like those described in "How to Construct Random Functions", O. Goldreich, S. Goldwasser, and S. Micali, *Journal of the Assoc. for Computer Machinery*, Vol. 33, No. 4 (Oct. 1986), 792–807.

The pseudo-random function F maps from the virtual memory address to a bucket address of the highest level buffer 18. It is a kind of hash function. Since different virtual addresses may map to the same physical bucket address, it is necessary that the buckets contain multiple memory locations to accomodate collisions.

The number of buckets is another important parameter. The highest level buffer 18 should have at least twice the number of buckets as the number of virtual memory locations. As such, the pseudo-random function F maps from the virtual bucket address space to a memory address space twice as large as the virtual memory address space.

The pseudo-random function F requires the seed S in order to operate properly. Since it is a pseudo-random function, knowing its seed reveals the pattern generated by the function. It is, therefore, necessary to keep secret the seeds that are utilized by the present invention to provide the mapping from the virtual memory address space to the buffer address spaces. The different seeds associated with each buffer are stored in memory. The seeds are encrypted so that they are not known to any adversaries.

The contents held in the slots of the buffers 21 can be readily observed by adversaries. To prevent adversaries from gaining any useful knowledge from such observation, the contents of each slot are encrypted prior to being stored in such slots. It is preferred that a private key probabilistic encryption method is used, such as presented in S. Goldwasser and S. Micali, "Probabilistic Encryption", *Journal of Computer and System Science*, Vol. 28, No. 2, 1984, 270–299. Whenever a value is stored in memory, every bit of the value is probabilistically encrypted. Specifically, a seed of the pseudo-random function F is stored into the protected CPU, and for every bit b, a new (unused before) argument i is picked. The encryption (i, b XOR (i)) is stored. Other encryption techniques, however, may be used.

When an encryption technique is used, an adversary only sees the encrypted contents of slots. As initially stored in a slot, the contents of a slot are already encrypted. The contents are encrypted, similarly, when they are retrieved and when they pass over the bus 20 to the protected CPU 10. Only inside the protected CPU 10 are the contents decrypted and manipulated. Once operations performed on the contents are complete, the results are encrypted and returned to the memory 14. Given that an adversary only sees encrypted contents, he is prevented from knowing the true contents of each slot, including the seeds. Hereinafter, it is assumed that all values stored in unprotected memory are already encrypted as described above.

FIG. 4 shows what is stored in a bucket of a buffer held in memory 14. The buckets are comprised of a plurality of slots or memory locations. Each slot holds three fields. First, it holds a data value 22. This data value 22 may be an instruction, an address or any other form of data. Second, each slot holds a pseudo-random function value 24. Third and last, each slot holds a virtual address value 26 that identifies the virtual address of the virtual memory location held in the slot.

The pseudo-random function value 24 eliminates the problem of an adversary replacing the true contents of a slot in a buffer with contents from another slot. The same pseudo-random function F is used to calculate the pseudo-random value 24 as was used to calculate the bucket address. However, a different seed denoted as (S') is stored in the physically protected CPU 10 so that it is not accessible to the adversary. The pseudo-random function value 24 is calculated as the value of F at the data value 22. As such, the pseudo-random function value is uniquely associated with the data value. Efforts to substitute a different data value result in an identifiable error highlighted by the lack of correspondence between the data value 22 and the pseudo-random function value 24. The error reflects that the pseudo-random function value 24 is a message that must be authenticated by the CPU 10 in order for execution of the program to continue. If an adversary puts an improper message into a bucket, execution of the program ceases.

In addition, a counter value is encoded in the data value 22 to prevent tampering by adversaries. In particular, the counter value is used to prevent the substitution of a data value previously held in the same bucket for the proper data value currently held in the bucket. The pseudo-random function 24 is not sufficient alone to prevent such substitution, for the previously calculated pseudo-random function value 24 would still be valid. Thus, a counter value for each buffer is encoded into the data values 22.

Every time that a buffer is obliviously rehashed (i.e. shuffled), the counter is incremented. Oblivious rehashing of buffers will be described in more detail below. Each time new contents are stored in a bucket, a unique counter value is associated with that storage. If new contents are stored in the bucket, it necessarily follows that the counter has already been incremented. There is, hence, a unique relationship between the step of storing a value and the counter value. Encoding the counter value in the data value 22 of a slot of a bucket prevents previously stored contents from being fraudulently substituted for current contents.

During typical execution of a program, the program and the data are initially stored in the highest level buffer 18 of the memory 14. Thus, the buffers are initially as shown in FIG. 5. The use of multiple buffers each having a unique mapping from the virtual address space allows the preferred embodiment to prevent an adversary from learning the virtual address access pattern of the executing program.

Once the program and its associated data are placed into the highest level buffer 18, the data processing system of the preferred embodiment is ready to execute the program. During execution numerous memory accesses are required. For each memory access, the system scans the entire level one buffer 16 searching for the virtual memory location it desires. Specifically, it scans for a particular virtual memory address. If it does not find the virtual memory address in the level one buffer 16, it then checks the level two buffer 2. It does not, however, scan the entire level two buffer 17, rather it only scans a single bucket. The bucket to be scanned is determined by calculating the pseudo-random function F value for the virtual address using the current seed of the level two buffer 17. If the virtual memory location is in the level two buffer 17, it is held only in the bucket specified by the pseudo-random function of the virtual address.

If the desired virtual memory location is also not in the level two buffer 17, the same process is continued for all subsequent buffers until the virtual memory location is found. When the appropriate virtual memory location is found, the contents of the bucket containing the proper virtual memory location is written into a temporary buffer denoted as B. So as to prevent an adversary from knowing when the desired virtual memory location is found, the data processing system mimics writing to the temporary buffer B after each access to a buffer.

If the data processing system finds the virtual memory location before searching all of the buffers, it does not stop; rather, it performs dummy random accesses to the remaining buffers. In particular, it randomly selects a bucket that it scans for each of the remaining buffers.

Figure 6:
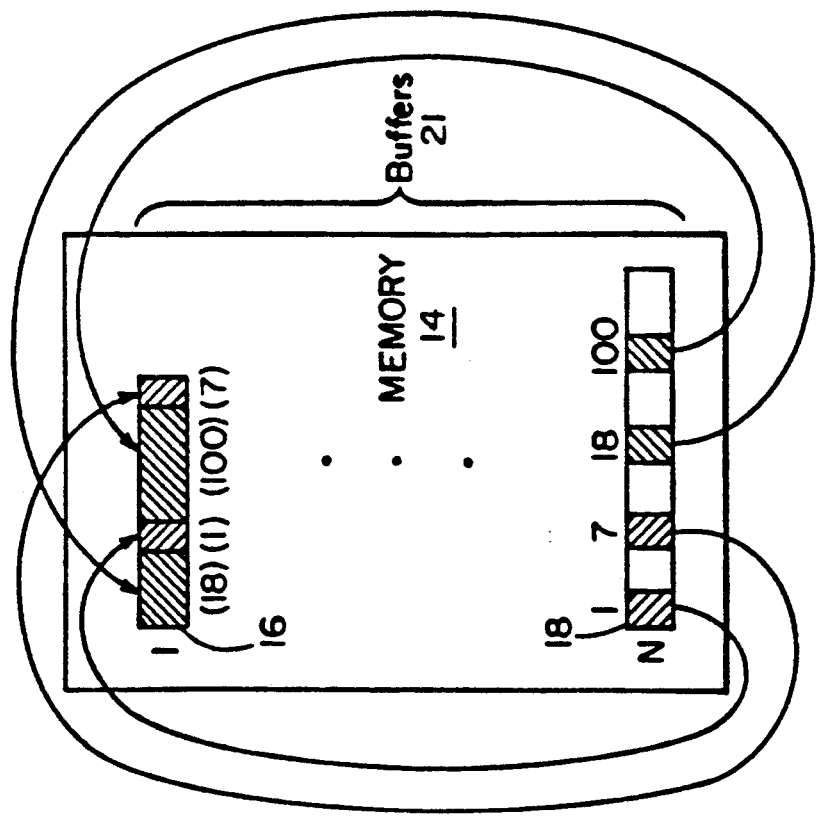
FIG. 6 shows an illustrative state of the memory after memory locations in the highest level buffer have been accessed.

When all of the buffers have had at least one of their buckets scanned, the contents of the search results for the search of the virtual memory location data value are copied from the temporary buffer B into the lowest level buffer 16. As is shown in FIG. 6, if the virtual memory location is found in the first bucket of the highest level buffer 18, bucket one is copied to the temporary buffer B. It is then copied into the lowest level buffer 16. Moreover, if subsequent virtual memory locations are found in bucket 7, 18 and 100, they are also copied into the buffer B and subsequently into the lowest level buffer 16. All data is encrypted as it is copied, and where data is not located a dummy copy routine is performed.

Figure 7:
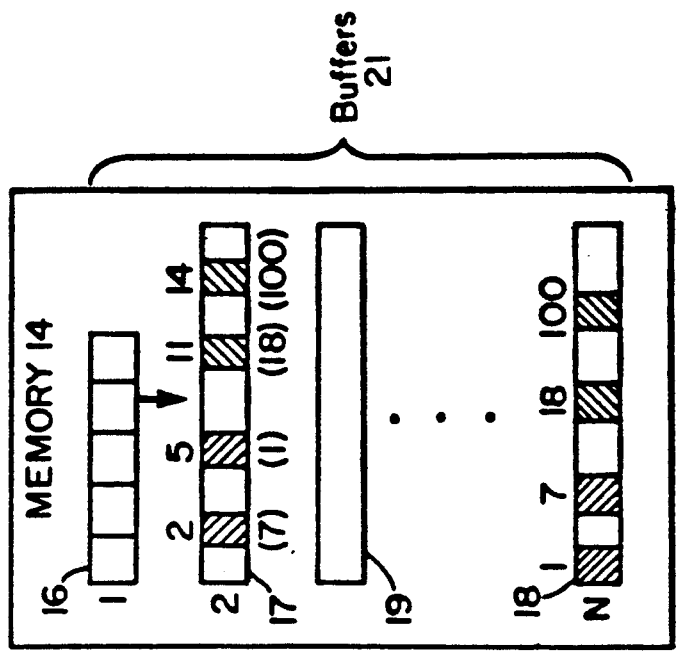
FIG. 7 shows an illustrative state of the memory after the contents of the lowest level buffer have been moved into the level 2 buffer.

When the lowest level buffer 16 becomes full from transfers originating from the other buffers, the contents of the lowest level buffer 16 are transferred into the level two buffer 17 as depicted in FIG. 7. The contents of the level two buffer 17 are then obliviously rehashed.

This process of moving the contents of a lower level buffer to a higher level buffer continues every time a buffer 17 becomes full. Thus, if the second level buffer 17 gets full, it is passed on to the third level buffer 19, and the third level buffer 19 is shuffled. The first level buffer 16 is scanned completely every time that a value is stored in or retrieved from the first level buffer 16.

This approach prevents an adversary from determining the virtual address access pattern of an executing program. The actual observed physical memory access pattern is independent of the type of program being executed.

In summary, to retrieve a virtual memory location L, one must:

1) Sequentially scan the level 1 buffer, looking for (v, L, F(L)). Where v is the data value, L is the virtual memory address and, F(L) is the pseudo-random function value. For each bucket, "mimic" the access pattern of copying the contents into B, a temporary bucket, but copy only if (v, L, F(L)) is found.

2) For i from 2 to N, do:
   a) Retrieve ith level seed $S_i$ of a pseudo-random function associated with buffer level i and compute F(L).
   b) If virtual location L has already been found, access a "random" location as follows: pick a random integer r between 1 and $4^i$ and scan bucket r (and execute access pattern of copying it into B).
   c) Else scan bucket number F(L) looking for triple (v, L, F(L)). If found, copy contents of this bucket into B, else just execute the access pattern.

3) Store value v of the virtual memory location L from B into first empty bucket of level 1 buffer.

As was mentioned previously, the present invention provides a very efficient mechanism for software protection. For each memory access, the highest level buffer 18 is scanned, and a bucket in each other level buffer are scanned. Since buckets are of size of at most log T, where T is the upper board on the running time of the protected program, these steps constitute $O((\log T)^2)$ operations. Further, each level i buffer is rehashed and each level (i−1) buffer is rehased into a level i buffer a total of $4^{N-i+1}$ times, where N is the total number of buffers. Since the joint size of the level (i−1) and (i) buffers is $O(4^i)$ and buckets are of size log T, it takes ($4^i$log T·log($4^i$log T)) operations to perform such rehashing. Hence, the total number of operations required to implement the software protection scheme is equal to:

$$\sum_{i=1}^{N} 4^{N-i+1} 4^i \cdot \log T \cdot \log(4^i \log T)$$

which is $O(T(\log T)^3)$. Therefore, the poly-logarithmic overhead (i.e. $O/(\log T)^3)$) of hiding the access pattern is amortized.

The oblivious rehashing is performed periodically at fixed time intervals, during execution of the program. It operates as follows. Suppose we are given an m-size memory block, in which every memory location contains a triple (V, L, F(L)), where V is the value of the virtual memory location L; and F(L) is a pseudo-random number, computed by using a pseudo-random function F with seed S, $1 \leq F(L) \leq 2$ m. Suppose we wish to "obliviously" store contents of this memory block into an array A of 2 m "elements", each "element" is a (log T) size memory block, $t \leq m$, so that triple (V, L, F(L)) is placed into A[F(L)]. (We call an array A a hash-table, and each "element" of it a "bucket"). Thus, a "bucket" is a (log T)—size memory block, each location of which is either empty, or contains a triple (V, L, F(L)). Moreover, all triples (V, L, F(L)) which are stored in a "bucket" must have matching F(L) number.

We begin by describing a merge operation, performed on two (log T) size memory blocks. Each block may contain triples (V, L, F(L)) as above, with matching F(L) values. If both arguments to the merge operation contain triples having matching F(L) values, the total number of such triples in both blocks does not exceed (log T)—(i.e. the size of a single block). Essentially, in cases where both blocks contain triples with matching F(L) values, the merge operation puts all triples into one bucket, and if the F(L) values do not match, the merge operation does nothing. We require, however, that the access pattern of the merge operation always be the same. The algorithm for the merge operation is as follows:

If two buckets have different F(L) values, the access pattern is equivalent to the one described below, but the contents of both buckets are not touched.

If two buckets have the same F(L) values, both buckets are scanned, and all the "empty" locations are marked with distinct negative integers.

Both buckets are "obliviously sorted" using a technique described by Oded Goldreich in "Towards a Theory of Software Protection by Oblivious RAMs," *Proc. ACM Symposium on Theory of Computing* (1987), so as to move all the actual contents into one of the them.

Note that both buckets are of size log T. Hence, the merge operation always takes O(log T log log T) steps. We can now proceed to describe "oblivious-rehashing" of A:

1. The original m-size memory block containing m triples (V, L, F(L)) is oblivilously sorted by F(L) keys. Note that for different L, the F(L) values might be the same. However, with high probability, there will not be a key F(L) for which there are more than O(log t) triples.

2. Another array B of size m elements wherein each element is of size log t is created. (With some abuse of terminology, we call elements of B "buckets", even though we do not treat B as a hash-table.)

3. The contents of the sorted memory are placed into the first half of B so that there is one triple for each bucket in a manner so as to preserve the order.

4. For i from 1 to m−1 do: bucket B(i) is merged into bucket B(i+1).

5. All the non-empty buckets are moved together by obliviously repermuting B at the bucket level. To do so, B is sequentially scanned and all the empty buckets are marked with some distinct negative integers and then obliviously sorted, at the bucket level.

6. B is scanned one more time so as to make a list of missing F(L) values, while scanning a non-empty portion of B. To do so, every time, when comparing F(L) of bucket (i) with F(L) of bucket (i+1), the missing numbers are recorded in between (recall that $1 \leq F(L) \leq 2$ m). (In addition, the boundary cases are recorded: the difference between 1 and F(L) for i = 1; and F(L') for i = m and 2 m.) Again, this list is obliviously sorted, so as to group together a list of "missing" F(L) numbers.

7. Hash-table A is repermuted at the bucket level according to newly generated keys in a manner similar to the technique of obliviously sorting memory contents. Then, B is scanned sequentially, and all the non-empty buckets are inserted into A buffer, under the new keys. Using a list of "missing" buckets, the "random" empty buckets of A are accessed so that the total number of buckets accessed in A is exactly m. (This prevents the adversary from learning how many "collisions" have actually occurred.)

8. The bucket order as it was before step 7 is then restored. To do so, A is randomly repermuted at the bucket level one more time, and then the hash-order is restored. (i.e. bucket number i is placed into array location A(i)).

Let us now calculate the cost of each step of "oblivious re-hash":

1. —O(m log m);
2. —O(m) (for initialization)
3. —O(m);
4. —O(m log T log log T);
5. —O(m log m log T);
6. —O(m log m);
7. —O(m log m log T);
8. —O(m log m log T);

Since T<m, the total cost of "oblivious re-hashing comes out to be O(m log m log T).

We note that in our general algorithm, one more step is required: to extract the actual memory "triples" from a hash-table. To do so, we treat hash-tables as a contiguous memory block (of size 2 m log T) and mark empty locations with negative numbers and "obliviously sort", making O(m log T log (m log T)) steps. Note, that since m log m log T ≤ m log T log (m log T), the total price for "oblivious re-hash" comes out to be O(m log T log (m log T)).

While the invention has been particularly shown and described with reference to preferred embodiments thereof, it will be understood by those skilled in the art that various changes in form and detail may be made without departing from the spirit and scope of the invention as defined in the appended claims.

We claim:

1. In a data processing system, a method for efficiently protecting an access pattern of an executing program to a plurality of unprotected addressable locations using a physically protected resource comprising the steps of:
   a) permuting an order in which values are stored in the unprotected addressable locations prior to beginning execution of the program;
   b) partially permuting an order in which values are stored in subsets of the unprotected addressable locations at various times during execution of the program, the partial permuting step including transferring values from one subset of the unprotected addressable locations to another subset of the unprotected addressable locations; and
   c) accessing the values at the unprotected addressable locations in light of the order imposed by the permuting step and the partial permuting step wherein access is achieved in a pattern independent of the original access pattern.

2. A method as recited in claim 1 wherein the number of unprotected addressable locations may be dynamically altered during execution of the program.

3. A method as recited in claim 1 wherein the permuting step and partial permuting step are performed using a pseudo-random function having a seed stored in the physically protected resource.

4. A method as recited in claim 1 wherein the frequency at which the partial permuting occurs during execution of the program for a subset of unprotected addressable locations depends on how many values are in the subset of unprotected addressable locations.

5. A method as recited in claim 1 wherein each subset of unprotected addressable locations is unique and does not share elements with other subsets.

6. A method as recited in claim 1 wherein there are log N order of magnitude subsets of unprotected addressable locations where N is the total number of unprotected addressable locations.

7. A method as recited in claim 6 wherein each subset has a unique level i associated with it that is designated by an integer in the range from 1 to log N.

8. A method as recited in claim 7 further comprising moving the values stored in subset of level i to a subset of level $i+1$ every $K^{i-1}$ steps where K is a constant.

9. A method as recited in claim 8 wherein moving further comprises partially permuting the subset of level $i+1$.

10. A method as recited in claim 1 further comprising the step of encrypting all values before storing them in the unprotected addressable locations.

11. A method as recited in claim 1 wherein the unprotected addressable locations comprise random access memory locations.

12. A method as recited in claim 1 wherein the unprotected addressable locations comprise entries in a distributed data base.

13. A method as recited in claim 1 wherein the unprotected addressable locations comprise a compound data structure.

14. A method as recited in claim 1 wherein each subset of unprotected addressable locations comprises a hash table.

15. In a data processing system, a method of hiding from an observer a pattern of access to memory by a program, comprising the steps of:
   a) storing the program and the data the program uses, comprised of a plurality of virtual memory locations specified by virtual addresses, in a highest level buffer of a set of buffers held in the memory wherein a physical address of a physical memory location in which a virtual memory location is stored is specified by a pseudo-random function of its virtual address;
   b) accessing each buffer whenever a memory access is sought;
   c) when a virtual memory location in a buffer is located by the program, moving contents of the location to a lowest level buffer; and
   d) when a buffer is full, moving its contents to a next higher priority buffer and pseudo-randomly rearranging the sequence in which the virtual memory locations are held in the next higher priority buffer.

16. A method as recited in claim 15 wherein the step of moving contents of a location in a buffer to a next level buffer comprises moving the contents to a location specified by a pseudo-random function of a virtual address of the contents.

17. A method as recited in claim 15 wherein the set of buffers comprises a set of hash tables.

18. In a data processing system a method of protecting a virtual address pattern of a program to a memory from an observer such that a physical address pattern of access of the program to the memory exhibited during execution of the program reveals no information about the virtual address pattern of the program to the memory, comprising the steps of:
 a) storing the program and the data, said program and data being comprised of a plurality of virtual memory locations specified by virtual addresses, in a level N buffer of a set of N buffers held in the memory, each buffer comprised of $X^L$ buckets where L is the level of the buffer and X is the number of buckets in a level 1 buffer, and for each virtual memory location, a physical address of a bucket comprised of physical memory locations in a buffer in which it is stored is specified by a pseudo-random function of its virtual address;
 b) scanning at least one bucket in each buffer when seeking a virtual memory location required for execution;
 c) moving the contents of a virtual memory location of a bucket in a buffer required for execution when it is found to a bucket in the level 1 buffer; and
 d) periodically during program execution, moving contents of a level L buffer to a level L+1 buffer such that each memory location is stored at an address in the level L+1 buffer that is a pseudo-random function of a virtual address.

19. A method as recited in claim 18 wherein the buffers are hash tables.

20. A method as recited in claim 18 wherein the pseudo-random functions are hash functions.

21. In a data processing system, a method of hiding a pattern of access by a program, comprising the steps of:
 a) storing the program and data the program uses, said program and data being comprised of a plurality of virtual memory locations having virtual addresses, in a highest level hash table of a set of hash tables that are organized into levels from lowest to highest, each hash table comprised of a plurality of buckets of physical memory locations and having a unique seed associated with it for a pseudo-random hash function;
 b) executing the program;
 c) scanning at least one bucket in each buffer when seeking a virtual memory location needed by the program for execution;
 d) moving contents of a bucket where virtual memory location required by the program for execution has been found to the lowest level hash table; and
 e) at fixed time intervals, moving contents of a hash table to a next highest level hash table such that each virtual memory location previously held in the hash table is stored at a bucket in the next highest hash table whose address is determined by the pseudo-random function.

22. A method as recited in claim 21 further comprising the step of storing the seeds for the pseudo-random hash function in memory.

23. In a data processing system, having a memory comprised of a plurality of buffers wherein each buffer is assigned a level designated by an integer value and each buffer is comprised of a plurality of buckets of physical memory locations, a method of accessing memory locations when executing a program so as to not reveal a virtual address access pattern, comprising the steps of:
 a) calculating a bucket address using a pseudo-random function of a virtual address of a virtual memory location sought to be accessed;
 b) examining memory contents at the bucket address to determine if the virtual memory location sought is held there;
 c) if the virtual memory location is not held there, calculating another bucket address for a next buffer using a pseudo-random function of the virtual address of the virtual memory location sought to be accessed;
 d) examining memory contents at the bucket address of the next buffer to determine if the virtual memory location sought is there; and
 e) if the virtual memory location is there, acting on the virtual memory location as dictated by the program and if it is not there, repeating steps c through d until the virtual memory location is found.

24. A method as recited in claim 23 wherein calculating a bucket address comprises determining a value of a pseudo-random hash function of the virtual address.

25. A method as recited in claim 23 further comprising the step of moving contents of a buffer to a next level buffer and rehashing the next level buffer.

26. A method as recited in claim 23 further comprising the step of copying contents of a bucket into a lowest level buffer if the virtual memory location is found.

27. A method as recited in claim 23 wherein all bucket addresses are calculated using a same pseudo-random function but with different seeds for each buffer.

28. A method as recited in claim 23 further comprising the step of performing false accesses to all buffers yet to be examined if the virtual memory location is found in the buffer so that it is not apparent to an observer which buffer holds the virtual memory location.

29. In a data processing system having a memory and physically protected CPU, a method of preventing an adversary from replacing contents of a physical memory location with contents from another physical memory location during execution of a program comprising the steps of:
 a) storing a seed for a pseudo-random function in a memory;
 b) storing in each memory location a data value, a virtual address and a value of a pseudo-random function of the data value, wherein a seed of the pseudo-random function is the seed stored in the physically protected memory space;
 c) checking using the CPU after each memory access to the memory locations in the memory whether a proper pseudo-random function value was stored in the accessed memory location; and
 d) if an improper pseudo-random function value was stored, terminating execution of the program.

30. In a data processing system having a memory, a method of preventing an adversary from replacing contents of a physical memory location with a previously held contents of said physical memory location during executing of a program, comprising the steps of:
 a) storing a seed for a pseudo-random function in a memory space accessible by the physically protected CPU, said CPU and memory space being inaccessible to the adversary;
b) incrementing a counter each time the memory is shuffled;
c) storing in each memory location a data value, a counter value corresponding to the counter's current value, and a value of the data value, a pseudo-random function wherein the pseudo-random function is a function of the data value, and a seed for the pseudo-random function is stored in the physically protected memory space;
d) checking for each memory access to the memory locations in the memory whether a proper counter value was stored in the accessed memory location; and
e) if an improper counter value was stored, terminating execution of the program.

31. A method as recited in claim 30 further comprising the step of encrypting the data values before storing them in the memory locations.

32. In a data processing system, a memory for protecting a program from adversaries, comprising:
a) a lowest level buffer comprised of X buckets of memory;
b) a highest level buffer comprised of $X^N$ buckets of memory wherein N is a total number of buffers;
c) $N-2$ buffers each having a unique level between the lowest level and the highest level and each having $X^L$ buckets where L is a level of the buffer;
wherein address spaces of the buffers pseudo-randomly map from virtual addresses of the program and data that the program uses, and virtual memory locations of the program and the data are stored in the buffers in accordance with the pseudo-random mappings.

33. A memory as recited in claim 32 wherein the buckets have multiple memory locations.

34. A memory as recited in claim 33 wherein the buckets have a constant number of memory location K, where 2K is an infeasible calculation.

35. A memory as recited in claim 32 wherein the buffers are comprised of hash tables.

36. A memory as recited in claim 32 wherein the pseudo-random mapping of the virtual addresses of the program to the address spaces of the buffers is performed by a hash function.

37. A memory as recited in claim 36 wherein a unique seed is associated with each level buffer and the seed is used by a pseudo-random function to implement the pseudo-random mapping.

38. In a data processing system, a method for efficiently protecting an access pattern of an executing program to a plurality of unprotected addressable locations using a physically protected resource comprising the steps of:
a) permuting an order in which values are stored in the unprotected addressable locations prior to beginning execution of the program;
b) partially permuting an order in which values are stored in subsets of the unprotected addressable locations at various times during execution of the program, the frequency at which the partial permuting occurs during execution of the program for a subset of unprotected addressable locations depending on how many values are in the subset of unprotected addressable locations; and
c) accessing the values at the unprotected addressable locations in light of the order imposed by the permuting step and the partial permuting step wherein access is achieved in a pattern independent of the original access pattern.

39. In a data processing system, a method for efficiently protecting an access pattern of an executing program to a plurality of unprotected addressable locations using a physically protected resource comprising the steps of:
a) permuting an order in which values are stored in the unprotected addressable locations prior to beginning execution of the program;
b) partially permuting an order in which values are stored in subsets of the unprotected addressable locations at various times during execution of the program, each subset of unprotected addressable locations being unique and not sharing elements with other subsets; and
c) accessing the values at the unprotected addressable locations in light of the order imposed by the permuting step and the partial permuting step wherein access is achieved in a pattern independent of the original access pattern.

40. In a data processing system, a method for efficiently protecting an access pattern of an executing program to a plurality of unprotected addressable locations using a physically protected resource comprising the steps of:
a) permuting an order in which values are stored in the unprotected addressable locations prior to beginning execution of the program;
b) partially permuting an order in which values are stored in subsets of the unprotected addressable locations at various times during execution of the program, there being log N order of magnitude subsets of unprotected addressable locations where N is the total number of unprotected addressable locations; and
c) accessing the values at the unprotected addressable locations in light of the order imposed by the permuting step and the partial permuting step wherein access is achieved in a pattern independent of the original access pattern.

41. A method as recited in claim 40 wherein each subset has a unique level i associated with it that is designated by an integer in the range from 1 to N.

42. A method as recited in claim 41 further comprising moving the values stored in subset of level i to a subset of level $i+1$ every $K^{i-1}$ steps where K is a constant.

43. A method as recited in claim 42 wherein moving further comprises partially permuting the subset of level $i+1$.

44. In a data processing system, a method for efficiently protecting an access pattern of an executing program to a plurality of unprotected addressable locations using a physically protected resource comprising the steps of:
a) permuting an order in which values are stored in the unprotected addressable locations prior to beginning execution of the program;
b) partially permuting an order in which values are stored in subsets of the unprotected addressable locations at various times during execution of the program, each subset of unprotected addressable locations comprising a hash table; and
c) accessing the values at the unprotected addressable locations in light of the order imposed by the permuting step and the partial permuting step wherein access is achieved in a pattern independent of the original access pattern.

* * * * *